United States Patent Office 3,671,380
Patented June 20, 1972

3,671,380
UV TRANSMITTING BOROSILICATE GLASS COMPOSITION AND ARTICLE
Mir Akbar Ali, Evanston, and Alexis G. Pincus, Chicago, Ill., assignors to IIT Research Institute, Chicago, Ill.
No Drawing. Filed Apr. 13, 1970, Ser. No. 28,012
Int. Cl. C03c 13/00; D02g 3/00
U.S. Cl. 161—175
4 Claims

ABSTRACT OF THE DISCLOSURE

A glass suitable for the transmission of radiation in the near ultraviolet region and having a relatively low index of refraction rendering the glass suitable for cladding glass in the manufacture of ultraviolet transmitting composite fibers. The glass is composed of $B_2O_3$, $SiO_2$, $Al_2O_3$, and $K_2O$ and is substantially free of ultraviolet absorbers.

---

The present invention relates to glass compositions and products made therefrom. More particularly, it is directed to glass compositions having high light transmission properties in the near region of the ultraviolet wavelength range as well as other desirable properties, making them especially suitable for cladding glasses in the manufacture of composite glass optical fibers.

The invention herein described was made in the course of or under a contract or subcontract thereunder with the Department of the Army.

Light in the broadest sense of the word includes radiation of all wavelengths from infrared through visible and ultraviolet. One portion of the light spectrum in the ultraviolet range has been designated the near ultraviolet region and includes wavelengths from 300 to 400 nanometers. It has long been known that particular glass compositions transmit certain wavelengths while absorbing others. Ordinary optical glass, for example, may transmit visible light very efficiently though it absorbs over 90 percent of the ultraviolet radiation in the near ultraviolet region. The absorption of ultraviolet radiation is caused in part by the presence of certain elements and compounds which are well known. These materials are termed ultraviolet absorbers and may seriously impair ultraviolet transmission even when they are present only in minute quantities.

The first requirement of an ultraviolet transmitting glass is that it be sufficiently free of ultraviolet absorbers to transmit a reasonable amount of light at the desired wavelength. For purposes of the present invention the lower limit of acceptable transmission will be defined as 50 percent of the ultraviolet radiation received at the outside surface of the glass of the desired thickness.

Materials for transmitting ultraviolet radiation are available and include diamond, quartz, and some special glasses. Each of these materials suffers some limitation in properties which makes it less than satisfactory for commercial applications, especially in the area of cladding glasses for fiber optics purposes. Most serious of the shortcomings of such materials are poor workability, high water solubility, and too high an index of refraction for cladding materials.

The poor workability, high water solubility and relatively high index of refraction of known ultraviolet transmitting materials are particularly serious when it is desired to use the ultraviolet transmitting glass as a cladding glass in fiber optics applications, for example, where the fibers are to be employed in a faceplate for a cathode ray tube in order to give a better resolution than is obtained with standard bulk glass faceplates. It is well known that for fiber optic applications the core glass of the fiber must have a high refractive index as compared to the refractive index of the cladding glass surrounding the core glass in order to obtain high light transmitting efficiency. At the same time, it is important that the cladding glass have high transmitting efficiency at the wavelengths employed so that any light refracted into the body of the cladding glass will be efficiently transmitted and reflected back into the core glass.

The difference in refractive indices of the core and cladding is reflected in the numerical aperture (N.A.) of the fiber, which is an indication of the efficiency with which an optical fiber conducts light through its length. The numerical aperture is a well known function of the refractive indices of the two glasses employed as the core and cladding material and is defined by the equation $N.A. = \sqrt{N_1^2 - N_2^2}$ where $N_1$ and $N_2$ are the refractive indices of the core and cladding glasses respectively. In order to achieve good light transmission in fiber form the material used for the fiber core and the material used for the cladding glass should preferably produce a numerical aperture greater than 0.80. A core glass suitable for use in fiber optics transmission of ultraviolet wavelengths in the near region is disclosed and claimed in U.S. patent application Ser. No. 858,450, filed Sept. 16, 1969 and assigned to the assignee of the present invention. The glasses disclosed in the above-mentioned application possess refractive indices of at least 1.70 and further posses the other desirable properties such as workability and a low coefficient of thermal expansion rendering them suitable for use as a core glass for fiber optics. Accordingly, a substitution of the value of 1.70 for the quantity $N_1$ in the above-noted equation and a value of 0.80 for the numerical aperture results in a required index of refraction for the cladding glass of 1.50 or less. It is this relationship that forms the basis for the stated need for a suitable cladding glass possessing a low refractive index. It should be pointed out at this point that the numerical aperture is not related to the internal transmission referred to earlier but is a function only of the relative refractive indices of the two glasses.

In addition to a low refractive index, a glass suitable for use as a fiber optics cladding material must be capable of being worked into filamentary form, preferably without great difficulty and expense. It should further have characteristics compatible with the available core glass in terms of coefficient of thermal expansion and chemical compatibility and should not be subject to deterioration of transmission properties due to exposure to ultraviolet radiation.

Accordingly, it is an object of the present invention to provide a fabricable glass composition having high light transmission properties in the near region of the ultraviolet range. It is a further object of the present invention to provide an ultraviolet transmitting glass having a relatively low index of refraction.

It is still a further object of the present invention to provide a composite glass fiber capable of efficient transmission of light in the near region of the ultraviolet range.

These and other objects of the present invention will become apparent in connection with the following description of the present invention.

The present invention is directed to a quaternary glass composition consisting essentially of $B_2O_3$, $SiO_2$, $Al_2O_3$ and $K_2O$, which is the fusion product of ACS grade boric acid, silicic acid, aluminum hydroxide and potassium carbonate. Batches of the proper proportions, when melted in a platinum crucible at about 1200 to about 1300 degrees centigrade for approximately 12 to 20 hours, produce a clear colorless glass which can be fabricated into desired forms.

During the melting process large quantities of silicic acid escape along with the volatile gases. This substantially changes the composition of the resulting batch. Therefore, it is preferable that during the melting operation the crucible be covered with a platinum lid to avoid excessive losses of silicic acid in the final composition. If the above precaution is followed, the resulting glass consists essentially of the following ingredients and percentages by weight; $B_2O_3$, between about 33.6% and about 47.0%; $SiO_2$, between about 37.0% and about 50.0%; $Al_2O_3$, between about 3.0% and about 9.0%; $K_2O$, between about 5.0% and about 19.0%. Selection of proportions of raw materials to achieve final compositions within these ranges is within the knowledge of one skilled in the art.

A preferred composition for the present invention consists essentially of 43.8% $B_2O_3$, 41.6% $SiO_2$, 5.7% $Al_2O_3$ and 8.9% $K_2O$, all percentages being by weight of the finished product. This particular composition produces a glass having a refractive index of about 1.47 at 320 nanometers wavelength and provides greater than 65.0% transmission at that wavelength through a ½ inch thickness. The composition possesses a coefficient of thermal expansion of $63.2 \times 10^{-7}$ cm./cm./° C. Achieving these properties for the glass is dependent on several factors including the use of the platinum crucible for melting in a clean furnace, using the best commercially available raw materials which are free from UV absorbing contaminants, and exercising due care to prevent contamination of the glass from furnace atmosphere during melting. The pure platinum crucible is important because most impurities in crucible materials would be ultraviolet absorbers.

The described glass composition, in addition to possessing a high ultraviolet transmission and a low refractive index, may be easily drawn into bubble-free fibers or sheaths and has a coefficient of thermal expansion matched by suitable core glasses. Furthermore, it possesses a low viscosity and a low softening point. This combination of properties causes the glass composition to be ideally suited for fiber optics applications, although it is apparent that the glass may be used in applications other than fiber optics if desired.

As indicated, the glass composition to possess the desired properties should be the fusion product of essentially chemically pure components. The ACS grade of materials is recommended since the addition of some elements or oxides to the system is considered deleterious, and is to be avoided. In particular, the ultraviolet absorbers, Fe, Ti, S, U, Mn, Cu, Ag, Au, V, Cr, Mo, W, Re, Pt, Rh, Ce and some of the other rare earths are to be avoided. Even trace amounts of these materials have a deleterious effect on transmission efficiency of the glass employed.

| Batch No. | Compositions, percent by weight | | | |
|---|---|---|---|---|
| | $K_2O$ | $Al_2O_3$ | $B_2O_3$ | $SiO_2$ |
| 157K-1 | 19.0 | 5.0 | 39.0 | 37.0 |
| 157K-2 | 17.4 | 9.0 | 33.6 | 40.0 |
| 157K-3 | 16.3 | 5.2 | 40.3 | 38.2 |
| 157K-4 | 11.6 | 5.5 | 42.5 | 40.4 |
| 157K-5 | 8.9 | 5.7 | 43.8 | 41.6 |
| 157K-6 | 9.5 | 3.0 | 47.0 | 40.5 |
| 157K-7 | 6.3 | 6.0 | 43.8 | 43.8 |
| 157K-8 | 6.7 | 3.2 | 47.0 | 42.8 |
| 157K-9A | 5.0 | 5.0 | 45.0 | 45.0 |
| 157K-10A | 5.0 | 5.0 | 40.0 | 50.0 |
| 157K-11 | 16.0 | 8.9 | 35.1 | 40.0 |

The table illustrates the compositions of several glasses formulated in accordance with the present invention including the preferred composition designated as Batch No. 157K-5. Each glass in the table exhibits an index of refraction of approximately 1.47 and a light transmission at 320 nanometers in excess of 50% through a ½ inch thickness. Each composition was formulated by weighing the components in powder form and mixing them together. Fusion was achieved in a pure platinum crucible maintained at a temperature of 1250° centigrade for sixteen hours in a pure alumina muffle furnace. The particular temperatures and times employed in the fusion are within the ordinary skill of the art and do not form part of the present invention. Upon cooling the glass compositions were all clear and colorless, and could be easily fabricated into desired forms.

The glasses of the present invention also transmit visible light unless doped with a visible light absorbing substance, for example, nickel oxide. They are chemically compatible with common core glasses and possess coefficients of thermal expansion in the range of 55 to $85 \times 10^{-7}$ cm./cm./° C. by comparison the core glasses referred to in the co-pending application Ser. No. 858,450 possess coefficients of thermal expansion ranging from 55 to $75 \times 10^{-7}$ so that the ranges of thermal expansion coefficients clearly overlap.

The manufacture of fibers employing a core glass and a cladding glass described herein can be accomplished by any one of several standard methods. For example, fibers may be formed directly from the molten state by using a double wall crucible from which the composite fibers are drawn with the cladding glass formed surrounding the core glass. Alternatively, the fibers might be drawn by preforming a rod of core glass and a tube of cladding glass then surrounding the core glass with the tube and heating and drawing the two simultaneously. Either of these well known methods or other known methods of forming fibers may be employed to draw fibers suitable for the transmission of ultraviolet light in the near region of the ultraviolet range.

When these fibers are employed in an application such as a cathode ray tube faceplate, the core glass is the primary transmitter of the ultraviolet light. The difference in the index or refraction between the core glass and the cladding glass results in the majority of light being reflected at the interface between the core glass and the cladding glass and remaining within the core glass of the fiber. The remaining light not contained within the core material passes into the cladding glass and is transmitted therein until it is reflected from the outer surface back through the interface of the cladding glass and core glass to proceed in the core glass through the faceplate. It is for this reason that the cladding glass should also possess a high transmission capability so that the small amount of light passing into the cladding glass is not dissipated but is reflected back into the core glass, resulting in a higher overall efficiency of the fiber. To further prevent losses the cladding glass may be coated with a reflective substance.

The glass compositions of the present invention as disclosed and claimed herein are novel composition exhibiting improved properties for the transmission of ultraviolet light while maintaining a low index of refraction and good mechanical properties. These properties are particularly useful in the growing field of fiber optics as cladding glass for ultraviolet transmitting fibers.

It should be understood, however, that the foregoing is presented by way of description of one environment in which the glass compositions of the present invention find utility. The compositions are in no way restricted to such applications and also find utility in bulk form.

We claim:

1. A readily drawable glass composition having a low index of refraction, a low softening point and a low melt viscosity, which composition is suitable for use as a cladding glass in fiber optic devices for the near ultraviolet spectral ring, said composition consisting essentially of between about 33.6 and 47.0 weight percent $B_2O_3$, between about 37.0 and 50.0 weight percent $SiO_2$, between about 3.0 and 9.0 weight percent $Al_2O_3$, and between about 5.0 and about 19.0 weight percent $K_2O$, said composition being essentially free of ultraviolet absorbers and having a coefficient of thermal expansion in the range of from about 55 to about $85 \times 10^{-7}$ cm./cm./° C. and a light transmission at 320 nanometers in excess of 50 percent through a one-half inch thickness thereof.

2. A glass composition as defined in claim 1, said composition consisting essentially of 43.8 percent $B_2O_3$, 41.6 weight percent $SiO_2$, 5.7 weight percent $Al_2O_3$, and 8.9 weight percent $K_2O$, said composition having a coefficient of thermal expansion of about $62 \times 10^{-7}$ cm./cm./° C. and a light transmission at 320 nanometers in excess of 65.0 percent through a one-half inch thickness thereof.

3. A composite glass fiber having a high numerical aperture and adapted to transmit light waves in the near region of the ultraviolet range, said fiber comprising a core of a suitable first glass having a high index of refraction and good light transmission properties in the near ultraviolet range, and a cladding layer of a second glass composition surrounding and in contact with said core, said second glass composition having a low index of refraction, a low softening point and a low melt viscosity, and consisting essentially of between about 33.6 and about 47.0 weight percent $B_2O_3$, between about 37.0 and 50.0 weight percent $SiO_2$, between about 3.0 and 9.0 weight percent $Al_2O_3$, and between about 5.0 and about 19.0 weight percent $K_2O$, said composition being essentially free of ultraviolet absorbers and having a coefficient of thermal expansion in the range of from about 55 to about $85 \times 10^{-7}$ cm./cm./° C. and a light transmission at 320 nanometers in excess of 50 percent through a one-half inch thickness thereof.

4. A composite glass fiber as defined in claim 3 wherein said composition consists essentially of 43.8 percent $B_2O_3$, 41.6 weight percent $SiO_2$, 5.7 weight percent $Al_2O_3$, and 8.9 weight percent $K_2O$, said composition having a coefficient of thermal expansion of about $62 \times 10^{-7}$ cm./cm./° C. and a light transmission at 320 nanometers in excess of 65.0 percent through a one-half inch thickness thereof.

References Cited
UNITED STATES PATENTS

| | | | |
|---|---|---|---|
| 2,570,878 | 10/1951 | Stanworth et al. | 106—54 |
| 3,198,642 | 8/1965 | Hagedorn | 106—50 X |
| 3,306,833 | 2/1967 | O'Leary | 106—52 D 6 |
| 2,657,146 | 10/1953 | Kreidl | 106—54 |
| 2,561,325 | 7/1951 | Duncan | 106—54 |
| 3,436,142 | 4/1969 | Siegmund et al. | 65—DIG. 7 |
| 3,494,354 | 2/1970 | Yokota et al. | 106—50 |

JAMES E. POER, Primary Examiner

W. R. SATTERFIELD, Assistant Examiner

U.S. Cl. X.R.

106—50, 54; 65—3, DIGEST 7

UNITED STATES PATENT OFFICE
CERTIFICATE OF CORRECTION

Patent No. 3,671,380     Dated June 20, 1972

Inventor(s) Mir Akbar Ali and Alexis G. Pincus

It is certified that error appears in the above-identified patent and that said Letters Patent are hereby corrected as shown below:

Column 4, line 35, change "or" to --of--;

Claim 1, Column 4, line 70, change "ring" to --range--.

Signed and sealed this 31st day of October 1972.

(SEAL)
Attest:

EDWARD M. FLETCHER, JR.　　　　　　　　　ROBERT GOTTSCHALK
Attesting Officer　　　　　　　　　　　　Commissioner of Patents